Sept. 3, 1957 A. N. SMITH ET AL 2,804,917
RETRACTABLE FUEL NOZZLE FOR GAS TURBINE COMBUSTOR
Filed July 26, 1955

Inventors:
Andrew N. Smith
Anthony Butrym
by *Kiess*
Their Attorney

United States Patent Office 2,804,917
Patented Sept. 3, 1957

2,804,917
RETRACTABLE FUEL NOZZLE FOR GAS TURBINE COMBUSTOR

Andrew N. Smith and Anthony Butrym, Schenectady, N. Y., assignors to General Electric Company, a corporation of New York Application July 26, 1955, Serial No. 524,542

3 Claims. (Cl. 158—73)

This invention relates to gas turbine powerplants and more particularly to a fuel nozzle which can be replaced while the powerplant is operating.

The availability of a gas turbine is seriously reduced by the requirement that it be shut down during nozzle changeover. This problem has been increased with the use of cheaper grades of fuels which shortens the life of the nozzle due to clogging and deterioration.

Accordingly, it is an object of this invention to provide a fuel spray nozzle assembly in which the nozzle can be replaced without shutting down the powerplant.

A further object is to provide a locking arrangement which prevents the nozzle from being removed from the combustor until the nozzle opening has been closed off, to prevent the escape of high pressure air or flame.

Figure 1:
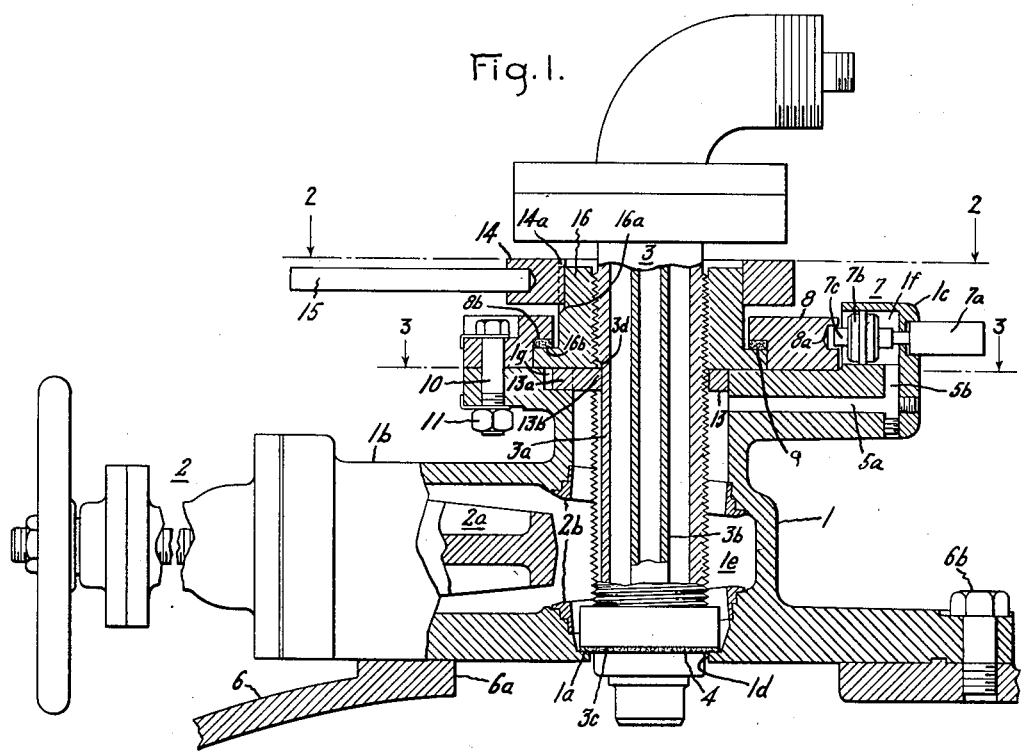
Figure 2:
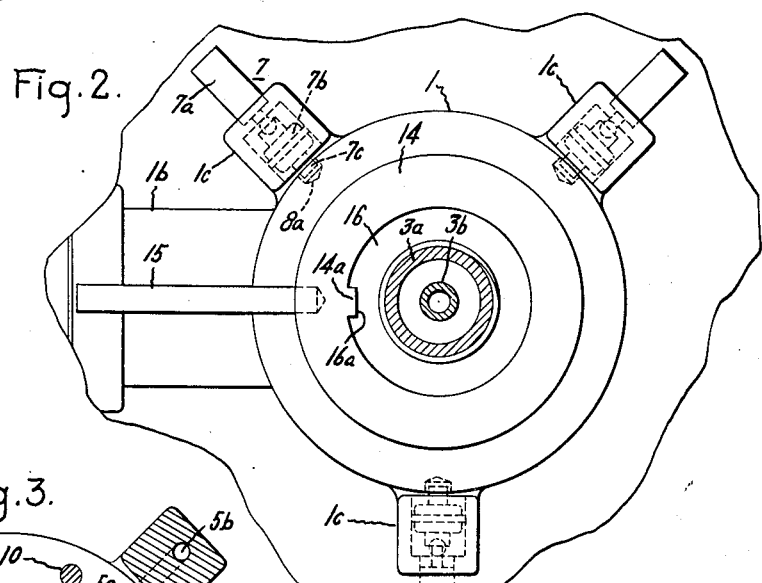
Figure 3:
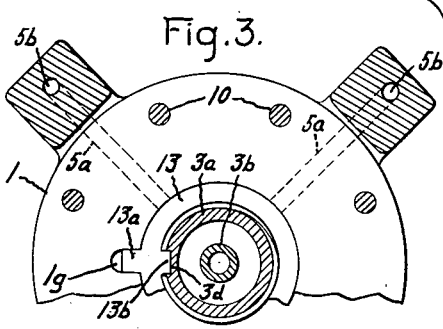

Other objects and advantages will become apparent from the accompanying drawings in which Fig. 1 is a front view partially in section showing the nozzle assembly, Fig. 2 is a plan view taken along lines 2—2 of Fig. 1, and Fig. 3 is a view taken along the lines 3—3 of Fig. 1.

Generally stated, the invention is practiced by providing a nozzle assembly in which the nozzle can be removed from the powerplant during operation, after the nozzle opening has first been closed to prevent hot gases from escaping from the combustion chamber. A replacement nozzle can then be inserted and the combustion chamber refired.

Referring to Fig. 1, there is illustrated a housing 1 secured to a combustion chamber 6 by bolts 6b. The housing 1 and combustion chamber 6 define coaxial openings 1d and 6a respectively through which extends nozzle 3. Nozzle 3 is a conventional type consisting of an air tube 3a and a fuel tube 3b. This type of nozzle is by way of example only since any of a number of types of nozzles could be used. The housing 1 defines a seat 1a against which the shoulder portion 3c of the nozzle 3 abuts. Located between the portion 3c and the seat 1a is a gasket 4 for preventing leakage of the motive fluid from the combustor 6 past the seat 1a into the housing. The lower portion of housing 1 defines a boss 1b. Secured to boss 1b and adapted to extend into chamber 1e formed by the housing 1 is a gate valve 2. The valve head 2a in the closed position engages valve seats 2b to seal off the combustion gases from the chamber 1e when the nozzle has been removed. The housing 1 also defines three boss sections 1c (Fig. 2). Each of these bosses communicates with the chamber 1e by a pair of interconnecting ports 5a, 5b. Defined by the bosses 1c are chambers 1f which are in communication with the passages 5b.

The upper part of the chamber 1e is closed by an assembly for removing the nozzle and a locking arrangement for maintaining the assembly in place which are described later in detail.

It can be appreciated that with this construction, the pressure in combustion chamber 6 will be transmitted through housing 1 to chamber 1f when the nozzle 3 has been moved out of engagement with seat 1a and the gate valve 2 is in the open position.

The aforementioned locking arrangement includes a locking ring 8 which is secured to the upper portion of housing 1 by bolts 10 and nuts 11. The function of locking ring 8 is to prevent the nozzle from being removed from its holding assembly until a pressure responsive locking mechanism disposed in chamber 1f is disengaged from the ring.

The locking mechanism located in the chambers 1f consists of a pressure responsive element 7 responsive to the pressure in chamber 1e which is transmitted through passages 5a, 5b. The pressure responsive element 7 consists of a handle 7a, piston 7b, and locking lug 7c. The locking lug is adapted to extend into recess 8a defined by ring 8 to prevent the locking ring from being removed until the lug is disengaged. The ring 8 is shown as defining three separate recesses but if desired the recess 8a could be annular so that specific alignment of the bolt holes would not be necessary. The lug 7c is biased into engagement with ring 8 by the pressure imposed on the right hand side of piston 7b (see Fig. 1). When the pressure in chamber 1f is relieved, the pressure responsive element 7 can be manually disengaged from ring 8 by moving the handle 7a to the right. The piston 7b is of such a size and the gas pressure in the combustor sufficiently high that it is impossible for the operator to retract plunger 7a against the gas pressure acting on piston 7b until the gate valve 2 is closed and the pressure in chamber 1f relieved.

With the outer portion of the ring being secured to the housing by the pressure responsive element 7, the inner portion of the ring 8 prevents the nozzle from being removed in the following manner. The ring defines a shoulder 8b which abuts shoulder 16b of jacking sleeve 16 to maintain it in place relative to the housing 1 until the ring 8 can be removed. Disposed between the ring 8 and jacking sleeve 16 is a bearing washer 9. This washer provides a bearing surface between the jack sleeve and ring during rotation of the sleeve for removing the nozzle.

The function of the jacking sleeve 16 is to withdraw the nozzle from its position relative to the combustor. Jack sleeve 16 is internally threaded to receive the exteriorly threaded nozzle tube 3a. The fit between the jack screw and nozzle 3 is such as to permit the leakage of gas therebetween. Secured to the jacking sleeve 16 is a wrench assembly consisting of a wrench portion 14 fitting over the jacking sleeve and connected thereto by a key and keyway 14a, 16a (see Fig. 2). Attached to the wrench 14 is an operating handle 15. The jacking sleeve is free to be rotated relative to the ring 8 to remove the nozzle.

Due to the weight and bulk of the nozzle assembly, it is desired that the nozzle be removed without rotating. To prevent rotation of the nozzle 3, a plate 13 is located between jacking sleeve 16 and shoulder 1g of housing 1. The plate 13 has tongue portions 13a, 13b disposed in grooves 3d, 1g (Fig. 3) defined by the nozzle 3 and housing 1 respectively. The nozzle is thus prevented from rotating by plate 13 and the plate is prevented from rotating by the housing 1.

After the fuel and air pipes have been disconnected, the nozzle is removed in the following manner.

The jacking sleeve 16 is rotated to move the nozzle 3 in an upward direction out of engagement with seat 1a. The nozzle is prevented from rotating by the plate 13 which is keyed to the nozzle 3 and housing 1 respectively. When the seal between the nozzle 3 and seat 1a is broken, the hot combustion gas under pressure will flow through openings 6a, 1d into chamber 1e. From chamber 1e the gases will flow through passages 5a, 5b into chambers 1f where it acts on piston 7b to move it to the left. This movement of piston 7b moves the lug 7c into engagement with locking ring 8.

After the nozzle 3 has been raised above the upper gate valve seat 2b, the disk 2a is closed by engagement with seats 2b. Thus, the combustion gas is sealed off from the housing chamber 1e by the gate valve head 2a. Due to the loose fit between the threads of the nozzle 3 and the jacking sleeve 16, the gas trapped in chamber 1e, passages 5a, 5b, and chamber 1f is free to leak out between the threads to atmosphere. When the gas has thus been vented, the three plungers 7 can be manually retracted to disengage lug 7c from recess 8a. Then bolts 10 and the upper portion of the nozzle assembly can be removed, with the air and gas tubes 3a, 3b, jacking sleeve 16, wrench assembly 14, 15, locking ring 8, and plate 13 being removed as a unit from housing 1.

On installation, the reverse order will take place. The jacking assembly will be disposed in place by the nuts 11 and bolts 10 and the handle 15 and wrench 14 operated to jack the nozzle down into position to where it is immediately adjacent the closed gate valve. The gate valve is then opened, permitting the hot combustion gases to flow into chamber 1f to urge the piston 7b into engagement with the locking ring 8. The nozzle can then be further jacked into position against seat 1a to seal the opening between the nozzle assembly and the combustion chamber. The gas trapped in chamber 1e will then eventually leak out through the space between the threads of the nozzle and the jacking sleeve. Fuel can then be readmitted through tube 3b and air through tube 3a and the gas in combustor 6 reignited, to place the combustor back into use.

Thus, it can be seen that a nozzle assembly arrangement is provided in which the fuel nozzle can be removed from the gas turbine while the turbine is operating. The nozzle assembly further provides a locking arrangement which prevents the nozzle from being removed when the nozzle opening in the combustor is open which, if allowed, would permit hot gases to flow through the nozzle opening and possibly burn those handling the nozzle assembly.

While a single embodiment of the invention has been described in detail herein, it will be obvious to those skilled in the art that many changes and substitutions of equivalents might be made. For example, if desired, the nozzle can be threaded to the housing and rotated for removal. Also, various types of locking means can be used. In addition, it is not necessary that a valve be built into the housing 1 since a standard valve could be used and the jacking and locking assembly secured thereto.

It is, of course, desired to cover by the appended claims all such modifications as fall within the true spirit and scope of the invention.

What we claim as new and desire to secure by Letters Patent of the United States is:

1. A nozzle assembly for a pressurized combustor comprising a housing defining a first chamber having at one end an opening adapted to be in communication with a port in the combustor, a nozzle extending through said first chamber and said opening and adapted to seal off said opening whereby gas is prevented from flowing from the combustor into the housing, a valve for sealing off said first chamber from the combustor when the nozzle is removed, first means for backing the nozzle out of the housing, second means secured to the housing for preventing the first means from completely removing the nozzle from the housing, locking means for preventing said second means from being removed until the valve is closed and the pressure in this first chamber is released, the locking means comprising a pressure responsive means disposed in a second chamber defined by said housing and adapted to engage said second means, the housing defining a passage interconnecting the second chamber and the portion of the first chamber located adjacent the side of the valve remote from the combustor, whereby when the nozzle uncovers said opening the gas under pressure entering said first chamber from the combustor will act on the pressure responsive means to urge it into engagement with said second means to prevent the nozzle from being completely removed until the valve has sealed off the flow of gas in the combustor and the pressure in the chambers have been released.

2. A nozzle assembly for a combustor comprising a housing defining first and second chambers, an opening at the base of said first chamber adapted to be in communication with a port in a combustor secured to the housing, a nozzle extending through said housing and adapted to close said opening, a valve for closing off the chambers from the flow of gases from the combustor when the nozzle has been removed, a jacking assembly secured to the housing for actuating the nozzle out of engagement with said housing, a locking ring secured to said housing and engaging said jacking assembly to prevent the jacking assembly from being removed until the locking ring is free to be removed, locking means engaging said locking ring, said locking means comprising a pressure responsive element disposed in said second chamber and responsive to the pressure therein to engage the locking ring, a passageway interconnecting the second chamber with the portion of the first chamber adjacent the side of the valve opposite from the combustor, whereby the gas under pressure in that portion of the first chamber acts on the pressure responsive element to engage the locking means to prevent the nozzle from being completely removed until the valve has sealed off the flow of gas from the combustor and the pressure in the chambers has been released, the pressure responsive element defining a lug adapted to engage a recess in said locking ring, and key means disposed between said housing and said nozzle whereby the nozzle is prevented from rotating while being removed from the first chamber.

3. A nozzle assembly comprising a housing having a first chamber terminating in an opening adapted to be in communication with a port in a combustor, an exteriorly threaded nozzle extending through said first chamber and closing said opening whereby gas is prevented from flowing into said first chamber, a jacking assembly for jacking the nozzle out of said housing, the jacking assembly comprising an internally threaded jacking sleeve in engagement with said nozzle and an actuating means secured to said jacking sleeve for manual removal of the nozzle, a locking plate disposed between the jacking sleeve and the housing, the locking plate defining tongue portions in engagement with grooves defined by the housing and nozzle whereby the nozzle is prevented from rotating while it is being jacked out of the housing, a locking ring secured to the housing and abutting the jacking sleeve for preventing removal of the nozzle, a second chamber defined by said housing, a piston in said second chamber defining oppositely disposed lug and handle portions, the lug adapted to be disposed in a recess in said locking ring, a passage defined by said housing between said first and second chambers in the portion of the first chamber adjacent the side of the valve remote from the combustor, whereby the pressure in that portion of the first chamber acts on the piston to urge the lug into engagement with the locking ring, valve means disposed adjacent said opening and adapted to stop the flow of gas from the combustor to the chambers when the nozzle has been removed to thereby permit the gas under pressure in said chambers to be vented through the clearances in the fit of the threads between the jacking sleeve and nozzle so that the lug can be disengaged from the locking ring to permit the nozzle to be removed.

References Cited in the file of this patent
UNITED STATES PATENTS

| 2,125,020 | Haynes | July 26, 1938 |
| 2,276,424 | Siversen et al. | Mar. 17, 1942 |
| 2,545,886 | Kooistra | Mar. 20, 1951 |
| 2,689,754 | Dunton | Sept. 21, 1954 |

FOREIGN PATENTS

| 140,850 | Sweden | June 16, 1953 |